Jan. 10, 1967 S. L. BROADHEAD, JR 3,297,882
LIMITER-COMPRESSOR CIRCUIT
Filed Dec. 30, 1963
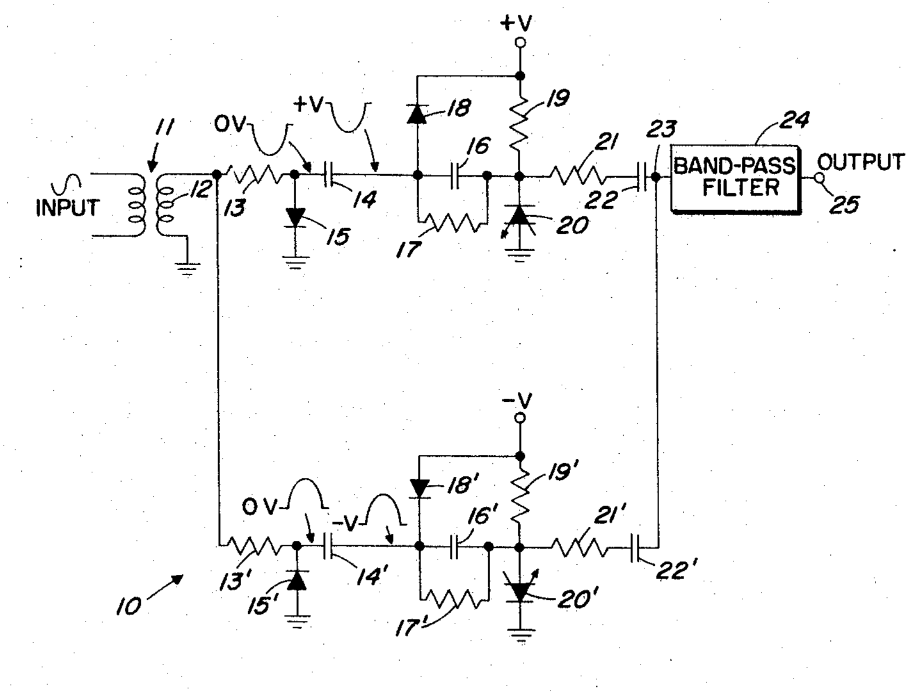
INVENTOR.
SAMUEL L. BROADHEAD JR.
BY
Woody and Kintzinger
ATTORNEYS United States Patent Office 3,297,882
Patented Jan. 10, 1967

3,297,882
LIMITER-COMPRESSOR CIRCUIT

Samuel L. Broadhead, Jr., Cedar Rapids, Iowa, assignor to Collins Radio Company, Cedar Rapids, Iowa, a corporation of Iowa Filed Dec. 30, 1963, Ser. No. 334,535
6 Claims. (Cl. 307—88.5)

This invention relates in general to limiting circuits and compressor circuits, and in particular to a combined limiting and compression circuit having less harmonic distortion than encountered with many limiting circuits and with many compression circuits.

Many limiter and many compressor circuits so use rectifying devices in the signal path that high harmonic and intermodulation distortion is troublesome. Further, many of these limiter and compressor circuits using bridge rectifiers have critical balance adjustment requirements and provide only limiting or only compression.

It is, therefore, a principal object of this invention to provide limiting and compression in the same circuit with greatly reduced harmonic distortion as compared with other limiting and/or compression circuits.

A further object is to combine compression over a desired range of reasonable amplitude variations with limiting of extremely high signal levels, such as encountered with noise pulses.

Another object is to provide a combined limiter and compressor without a critical balancing characteristic and without adjustment requirements.

Features of this invention useful in accomplishing the above objects in a highly reliable, relatively simple combined limiter-compressor circuit, include dividing the input signal between two circuit paths, each acting on one polarity half of the signal cycles, and rectifying out the opposite polarity half of the signal cycles and with each signal path making use of the unique characteristics of voltage variable capacitors (Varicaps). In the circuit, the anode of the Varicap of one circuit path is connected to ground, while the cathode of the Varicap of the other circuit path is connected to ground. In order that the two circuit paths operate in respective opposite polarity halves of the input signal cycles, a clipping diode is connected from each signal path to ground, one with the cathode to ground and the other with its anode to ground. Each of the signal paths also includes a diode between the signal path and a voltage supply, of appropriate polarity for the respective path, for reducing voltages applied across the respective Varicaps when the signal in each path exceeds a predetermined value. Each circuit path also includes RC circuit means having fast signal attack characteristics and additional RC circuit means having long decay characteristics.

A specific embodiment representing what is presently regarded as the best mode of carrying out the invention is illustrated in the accompanying drawing.

Referring to the drawing:

The limiter-compressor circuit 10 is shown to have a signal input coupling transformer 11 with a secondary coil 12 connected between ground and the input terminal of the circuit, although obviously other suitable signal input coupling means could be employed. From the input terminal the limiter-compressor circuit 10 divides into two paths, with the description for one path being more complete than that for the other path, since the two circuit paths are symmetrical and work identically except in being for opposite polarity halves of the input signal cyles. Thus, components for the top circuit path are included in a more thorough explanation, and the corresponding components for the lower path will carry prime numbers, as a matter of convenience.

In the upper circuit path, signal path resistor 13 is connected between the input terminal and capacitor 14. The common junction of resistor 13 and capacitor 14 is connected through diode 15 to ground, with the anode of the diode connected to the common junction, and the cathode to ground. The other side of capacitor 14 is connected, through a common junction, to an additional capacitor 16, a resistor 17, connected in parallel around capacitor 16, and to the anode of diode 18. The cathode of the diode 18 is connected to a positive voltage supply. The positive voltage supply is also connected through resistor 19 to a common junction with capacitor 16, resistor 17, and Varicap 20 and on through Varicap 20 to ground. The Varicap 20 has its cathode connected to the common junction of resistors 17 and 19, and capacitor 16, and its anode connected to ground. The signal path from this common junction passes on serially through resistor 21 and capacitor 22 to the common junction 23 of the upper signal path with the opposite polarity lower signal path, and through a bandpass filter 24 of conventional nature, to an output terminal 25 for connection to utilizing equipment as desired.

The Varicap 20 and 20' are a utilization of the voltage sensitive junction capacitive characteristics of semiconductor diodes as variable capacitance in a limiter-compressor circuit. These semiconductor devices are of the type comprising a P–N junction which, when forwardly biased (positive to the P-type material and negative to the N-type material) permit passage of current. When reverse biased (negative to the P-type material and positive to the N-type material) each blocks the flow of current with the junction of each exhibiting capacitance as an inverse function of the reverse bias. These devices are known, and may be, for example, those described in an article entitled "Semi-conductor Variable Capacitors" by H. R. Smith in the December 1958 issue of Radio and T.V. News magazine, wherein such devices are defined as commercially available Varicaps and Semicaps. Because of the diode characteristics of these voltage variable capacitors (Varicaps) they may be described as being polarized in the sense that a diode is polarized, and may be referred to as including a cathode and an anode just as with a diode. The Varicaps 20 and 20' are each illustrated as a composite representation of two parallel lines for capacitance, a diode symbol between the parallel lines to represent the polarization characteristics, and an arrow to indicate variability.

During operation, particularly with reference to the upper circuit path, diode 15 clips the positive half cycles leaving only negative half cycles below the reference voltage (ground), as indicated by a negative half cycle curve indication immediately above the common junction of resistor 13, capacitor 14, and diode 15. A signal curve with negative going half cycles duplicating the signal curve input to capacitor 14 is developed at the other side of capacitor 14, except that the base line is substantially at the voltage of the positive voltage supply of this upper circuit path and with the half cycles negative going from that voltage level. Diode 18, with its orientation between capacitor 14 and the positive voltage supply, rectifies excessive positive voltages of the base line of the negative going half cycle waveform out of capacitor 14. This effectively reduces voltage across Varicap 20 and thereby gives effective signal compression. A fast attack time characteristic for this compression is provided with the fast attack RC time constant characteristics of the resistor 13 and capacitor 14 circuit with a D.C. path to ground through transformer secondary coil 12. Long decay characteristics required for the desired signal compression effect is provided with the long time delay characteristics of the RC circuit including resistors 17 and 19, and capacitor 14.

The voltage variable capacitor (Varicap) 20 is back biased during the no signal state by the positive voltage supply. It should be noted that the Varicap 20 forms, with capacitor 16, a capacitive voltage divider between the circuit input path to capacitor 16 and ground, and that the capacitance of the Varicap is, generally speaking, approximately proportional to the reciprocal of the square root of the biasing voltage at any one instant across it. Hence, with negative going half cycle signals being passed along the signal path, the voltage across the Varicap 20 is reduced. Simultaneously, with each negative going half cycle signal pulse, the capacitance across the Varicap 20 goes up to effectuate very effective and efficient signal limiting through the action of the variable capacitive voltage divider. The resultant half cycle output is thereafter passed through resistor 21 and capacitor 22 to junction point 23, where it is joined to the signal output of the lower circuit path for passage through a bandpass filter 24 to an output terminal 25 as desired.

Referring to the lower circuit path, the diode 15' has its cathode connected to the lower circuit path and its anode to ground to clip the negative half of the cycle and leave the positive going signal half cycles from a voltage potential reference (ground) as the signal being processed through the lower limiter-compressor circuit path. In this lower circuit path, the voltage supply is a negative voltage supply, diode 18' has its anode connected to the negative voltage supply and its cathode connected to the circuit path, and Varicap 20' has its anode connected to the circuit path and its cathode connected to ground. All the components in the lower circuit path are substantially the equivalent of the corresponding components of the upper circuit path with only diodes 15' and 18', and Varicap 20' reversed in orientation from the corresponding components of the upper circuit path, and further with the voltage supply being a negative voltage supply of substantially the same magnitude as the corresponding positive voltage supply of the upper circuit path.

Components and values used in a quite successful limiter-compressor according to the invention as shown in the drawing, for operation in the I.F. signal range, include the following:

| | |
|---|---|
| Resistors **13** and **13'** | 1K ohms. |
| Capacitors **14** and **14'** | 0.01 microfarad. |
| Diodes **15** and **15'** | 1N916. |
| Capacitors **16** and **16'** | 10.0 micro-microfarad. |
| Resistors **17** and **17'** | 100K ohms. |
| Diodes **18** and **18'** | 1N916. |
| Resistors **19** and **19'** | 100K ohms. |
| Varicaps **20** and **20'** | Hughes' No. 7005 (Hughes Aircraft Company). |
| Resistors **21** and **21'** | 10K ohms. |
| Capacitors **22** and **22'** | 0.01 microfarad. |
| Positive voltage supply | +2 volts. |
| Negative voltage supply | −2 volts. |

A low impedance signal source is used. Further, a bandpass filter 24 was used having the desired I.F. signal bandpass range. It should be noted that such a limiter-compressor could also be used in various audio frequency ranges with the bandpass filter 24 eliminated and with appropriate component value variations for successful limiter-compressor operation in the desired range. For such different frequency range use, if Varicaps having sufficiently capacitive capabilities prove unavailable, the requirements may be met by multiple Varicaps being installed in parallel from each of the circuit paths to ground.

Whereas this invention is here illustrated and described with respect to a specific embodiment thereof, it should be realized that various changes may be made without departing from the essential contribution to the art made by the teachings hereof.

I claim:

1. In a limiter-compressor circuit, signal input means; a D.C. return to a voltage potential reference; signal path means connected to said signal input means; a voltage variable capacitor; a first diode connected between the signal path means and the voltage potential reference, and with said first diode having a predetermined orientation; said signal path means including a first capacitor, and connection through said first capacitor to a common junction of a second diode, a second capacitor, and impedance means parallel to said second capacitor, and with said second diode connected to a voltage supply with the same orientation toward the voltage supply as the orientation of said first diode toward the voltage potential reference; impedance means connected between said voltage supply and a common junction of said second capacitor and said voltage variable capacitor; said voltage variable capacitor being connected between said voltage potential reference and said signal path means with opposite orientation from the orientation of said first diode relative to the signal path means; and signal path circuit means from said common junction of said second capacitor and said voltage variable capacitor to an output terminal for connection to utilizing equipment.

2. The limiter-compressor circuit of claim 1, including additional signal path means duplicating the signal path means of claim 1 between the signal input means and the output terminal with, the first diode, the second diode, and the voltage variable capacitor of said additional signal path means being reversed in orientation from the corresponding components of the signal path means of claim 1; and with the voltage supply of the additional signal path means being of opposite polarity from the voltage supply of the signal path means of claim 1.

3. The limiter-compressor circuit of claim 2, including impedance means between said signal input means and the first diode of each signal path means; and additional impedance means in each signal path between said second mentioned common junction and said output terminal.

4. The limiter-compressor circuit of claim 3, wherein all of said impedance means include resistors; and said additional impedance means in each signal path between said second mentioned common junction and said output terminal also includes a capacitor.

5. In a limiter-compressor circuit, signal input means; first signal path means and second signal path means connected to said signal input means, with both first and second signal path means including serially: a first resistor, a connection with a first diode also connected to a voltage potential reference, with the anode to cathode orientation of the first diode of the first signal path means reversed from the first diode orientation of the second signal path means; a capacitor in both said first and second signal path means; a common junction with a second diode, a second capacitor, and a second resistor in both said first and second signal path means; with the second diodes connected to voltage voltage supplies of opposite polarity in the respective said first and second signal path means; said second resistor being connected in parallel with said second capacitor; said second diode being connected to the voltage supply of the respective signal path means with the same orientation toward the voltage supply as the orientation of the first diode connected to that signal path means toward the voltage potential reference; the voltage supply of each signal path means being connected through a third resistor to that particular signal path means to a second common junction in the respective signal path means of the second capacitor, second resistor, and a voltage variable capacitor; with said voltage variable capacitors respectively connected between said voltage potential reference and the respective signal path means with opposite orientation from the orientation of said first diode of the respective signal path means; each signal path means also including, serially, a fourth resistor and a third capacitor connected to a common output terminal for connection to utilizing equipment.

6. The limiter-compressor circuit of claim 5, wherein said voltage potential reference is ground; there is a D.C. path to ground from one side of said first capacitor through the signal input means; the component values of the first resistors and the first capacitors are chosen for a fast attack RC time constant; and with the first capacitors, along with the second resistors and third resistors of both circuits chosen for long decay RC circuit characteristics.

No references cited.

ARTHUR GAUSS, *Primary Examiner*.

J. ZAZWORSKY, *Assistant Examiner*.